US006526058B1

(12) United States Patent
Czajkowski et al.

(10) Patent No.: US 6,526,058 B1
(45) Date of Patent: Feb. 25, 2003

(54) VODSL SERVICE PROVISION

(75) Inventors: Igor K Czajkowski, Bishop's Stortford (GB); Leslie Humphrey, Harlow (GB); Brian Michael Unitt, Bishop's Stortford (GB); Michael F Grant, Bishop's Stortford (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/375,758

(22) Filed: Aug. 18, 1999

(51) Int. Cl.[7] .............................................. H04L 12/28
(52) U.S. Cl. ..................................................... 370/395
(58) Field of Search ............................... 370/395, 280, 370/386–389, 253, 351, 371–377, 432, 463–466, 410, 392, 228; 455/403, 450; 375/235, 286; 379/9, 27.01

(56) References Cited

U.S. PATENT DOCUMENTS

| 5,487,063 | A | | 1/1996 | Kakuma et al. |
| 6,272,209 | B1 | * | 8/2001 | Bridger et al. ................. 379/27 |
| 6,347,075 | B1 | * | 2/2002 | Barzegar et al. ............ 370/228 |

OTHER PUBLICATIONS

"Offering Video Services over Twisted Pair Cables to the Residential Subscriber by means of an ATM based ADSL Transmission System" Hauwermeiren Van L et al. Proceedings of the International Switching Symposium, DE, Berlin, VDE Verlag, vol. SYMP. 15, Apr. 23, 1995, pp. 447–451, XP000495611.

* cited by examiner

Primary Examiner—Kwang Bin Yao
Assistant Examiner—Prenell Jones
(74) Attorney, Agent, or Firm—Lee, Mann, Smith, McWilliams, Sweeney & Ohlson (57) ABSTRACT

A Digital Access Systems (DAS) Customer Premises Equipment (CPE) comprising: a DAS modem connected to an internal packet switched network having a switch and arranged such that the internal network is coupled to an external packet switched network by a DAS link over an access network; a network-telephony interface connected to the internal network and coupled to a customer premises telephony appliance; a network-data interface connected to the internal network and coupled to a customer premises data appliance; a controller to control the switch for establishing packet transfer paths between the modem and the interfaces to complete calls between the appliances and entities on the external network; and transferring of control and information signals between the controller and a computing function to adapt the controller to provide alternative packet transfer paths dependent on predetermined conditions in order to provide one or more additional CPE services.

29 Claims, 5 Drawing Sheets

VODSL SERVICE PROVISION

FIELD OF THE INVENTION

The present invention relates to communications access networks, and in particular to Voice-over Digital Subscriber Line customer premises equipment and services provision.

Reference is made to applicants co-pending applications of the same date and titled "Enhanced VoDSL Service Provision" (our reference 10850ID: Czajkowski) and "Enhanced Performance VoDSL" (our reference 10880ID: Czajkowski). The contents of these applications are intended to be incorporated herein.

BACKGROUND OF THE INVENTION

Telephone access networks have historically always been connection orientated, typically using dedicated copper wire circuits between subscribers and the exchange or central office. Typically these access networks were designed to carry only voice with a bandwidth of less than 4 kHz. However in recent years with the growth of the internet and demand for other multi-media services such as video-on-demand and video conferencing, subscribers of telephone companies have demanded additional bandwidth over the access network to provide adequate Internet and multi-media services access.

The Integrated Services Digital Network (ISDN) protocol was developed as an access network architecture for delivering all types of services including voice, data and video for example. Although ISDN provides a single access technology, it is limited by offering only "narrow band" communications speeds and relatively high pricing for terminal equipment and network access. This, together with the lack of "imaginative" residential services that could capitalize on the underlying bandwidth capacity, has seen the technology being confined to larger business customers.

Digital Subscriber Line (DSL) modem technology has enabled the transmission of digital information at duplex rates from 144 Kbits/s to over 1 Mbits/s over the local subscriber loop consisting of unshielded twisted pair cable. Reference is made to IEE Electronics Communication Engineering Journal, Vol.11, No. 3, Page 125 (June 1999) for additional background on DSL technology. The demand for additional telephone lines and integrated telephony and data services has given rise to voice-over DSL (VoDSL) solutions, which use modem technologies to deliver services in-band over a single physical line. For example, a VoDSL offering may provide a Customer Premises Equipment (CPE) functionality with 4 POTS (Plain Old Telephony Service) ports, each with a unique telephone number, and an ethernet port for high speed data access to an Internet Service Provider (ISP). All the POTS (typically voice or fax conduits) lines are provided as digitally derived services. VoDSL is an emerging technology, and as such requires subscriber acceptance and take-up both for the future development of this technology and to repay access network operator investment in the VoDSL equipment.

SUMMARY OF THE INVENTION

It is an object of the present invention to provide improved VoDSL customer premises equipment functionality.

It is a further object of the present invention to provide subscriber of VoDSL access networks with improved services capability.

In a first aspect the present invention provides Digital Access Systems (DAS) Customer Premises Equipment (CPE) comprising: an internal packet switched network comprising a switch; a DAS modem connected to said internal network and arranged such that in use the internal network is coupled to an external packet switched network by a DAS link over an access network; a network-telephony interface connected to said internal network and coupled to a customer premises telephony appliance; a network-data interface connected to said internal network and coupled to a customer premises data appliance; a controller arranged to control said switch in order to establish packet transfer paths between said modem and said interfaces to complete calls between said appliances and entities on the external network; and means for transferring control and information signals between said controller and a computing function in order to adapt the controller to provide alternative packet transfer paths dependent on predetermined conditions in order to provide one or more additional CPE services.

Preferably said DAS is Voice over Digital Subscriber Line (DSL).

Preferably wherein said means comprises an application programmers interface enabling function corresponding to an application programmers interface enabling function in said computer function which together form an application programmers interface (API) between said means and said computer function over which said signals are transferred.

Preferably wherein said CPE comprises said computing function.

Alternatively wherein said computing function is external to said CPE.

Preferably wherein said computing function is associated with a Personal Computer connected to said network-data interface.

Preferably said API is formed across said interface.

Preferably said switch is a multicasting switch.

Preferably said internal network is an ATM network.

Preferably said telephony appliance comprises a telephone or a fax.

Preferably said data appliance comprises a Personal Computer.

Preferably said controller is a control processor

In a second aspect the present invention comprises a system comprising a DAS CPE, a customer premises data appliance connected to said CPE, a customer premises telephony appliance connected to said CPE, wherein said CPE is connected in use to an access network, and wherein said CPE comprises: an internal packet switched network comprising a switch; a DAS modem connected to said internal network and arranged such that in use the internal network is coupled to an external packet switched network by a DAS link over said access network; a network-telephony interface connected to said internal network and coupled to said customer premises telephony appliance; a network-data interface connected to said internal network and coupled to said customer premises data appliance; a controller arranged to control said switch in order to establish packet transfer paths between said modem and said interfaces to complete calls between said appliances and entities on the external network; and means for transferring control and information signals between said controller and a computing function in order to adapt the controller to provide alternative packet transfer paths dependent on predetermined conditions in order to provide one or more additional CPE services.

Preferably said DAS is VoDSL.

In a third aspect the present invention provides a method of operating a VoDSL CPE to provide a re-routing of incoming calls service, said CPE comprising: an internal packet switched network comprising a switch; a DSL modem connected to said internal network and arranged such that in use the internal network is coupled to an external packet switched network by a DSL link over an access network; two or more network-telephony interfaces connected to said internal network and coupled to a first and second customer premises telephony appliance respectively; a network-data interface connected to said internal network and coupled to a customer premises data appliance; a controller arranged to control said switch in order to establish packet transfer paths between said modem and said interfaces to complete calls between said appliances and entities on the external network; said method comprising: receiving an incoming call for said first telephony appliance; determining whether said incoming call is to be re-routed to said second telephony appliance dependent on one or more pre-determined conditions; if said call is to be re-routed, adapting said controller to establish a packet transfer path for said call to said second network-telephony interface in order to re-route said call to said second telephony appliance.

Preferably pre-determined condition is a pre-determined time of day.

Alternatively or in addition said pre-determined condition is a pre-determined absence of the user of said first telephony appliance.

In a fourth aspect the present invention provides a method of operating a VoDSL CPE to provide a re-routing of incoming calls service, said CPE comprising: an internal packet switched network comprising a switch; a DSL modem connected to said internal network and arranged such that in use the internal network is coupled to an external packet switched network by a DSL link over an access network; two or more network-telephony interfaces connected to said internal network and coupled to a first and second customer premises telephony appliance respectively; a network-data interface connected to said internal network and coupled to a customer premises data appliance; a controller arranged to control said switch in order to establish packet transfer paths between said modem and said interfaces to complete calls between said appliances and entities on the external network; said method comprising: receiving an incoming call for said first telephony appliance; receiving incoming caller identity information from said call; determining whether said incoming call is to be re-routed to said second telephony appliance dependent on the identity of said caller; if said call is to be re-routed, adapting said controller to establish a packet transfer path for said call to said second network-telephony interface in order to re-route said call to said second telephony appliance.

Preferably said incoming caller identity information is a Calling Line Identifier (CLI)

In a fifth aspect the present invention provides a method of operating a VoDSL CPE to provide a call monitoring and logging service, said CPE comprising: an internal packet switched network comprising a switch; a DSL modem connected to said internal network and arranged such that in use the internal network is coupled to an external packet switched network by a DSL link over an access network; a network-telephony interface connected to said internal network and coupled to a first customer premises telephony appliance; a network-data interface connected to said internal network and coupled to a customer premises data appliance; a controller arranged to control said switch in order to establish packet transfer paths between said modem and said interfaces to complete calls between said appliances and entities on the external network; said method comprising: receiving an outgoing call from said telephony appliance; receiving called party identity information from said appliance; storing said called party information; determining when the called party answers the outgoing call; determining when the call is terminated; determining the length of said call; storing said call length with said called party information.

In a further aspect the present invention provides a method of operating a VoDSL CPE to provide a voice mail service, said CPE comprising: an internal packet switched network comprising a switch; a DSL modem connected to said internal network and arranged such that in use the internal network is coupled to an external packet switched network by a DSL link over an access network; a network-telephony interface connected to said internal network and coupled to a first customer premises telephony appliance; a network-data interface connected to said internal network and coupled to a customer premises data appliance; a controller arranged to control said switch in order to establish packet transfer paths between said modem and said interfaces to complete calls between said appliances and entities on the external network; said method comprising: receiving an incoming call for said telephony appliance; determining whether said incoming call is to be re-routed to said data appliance dependent on a pre-determined condition; if said call is to be re-routed, routing said call to said data appliance which is arranged to record said call.

Preferably said pre-determined condition is a pre-determined absence of the user of said telephony appliance or failure of said user to answer said call.

In a yet further aspect the present invention provides a method of operating a VoDSL CPE to provide a fax call to PC routing service, said CPE comprising:

an internal packet switched network comprising a switch;

a DSL modem connected to said internal network and arranged such that in use the internal network is coupled to an external packet switched network by a DSL link over an access network;

a network-telephony interface connected to said internal network and coupled to a first customer premises telephony appliance;

a network-data interface connected to said internal network and coupled to a customer premises data appliance;

a controller arranged to control said switch in order to establish packet transfer paths between said modem and said interfaces to complete calls between said appliances and entities on the external network;

said method comprising:
receiving an incoming call;
determining that said incoming call is intended to be received by a fax machine;
determining whether said incoming call is to be re-routed to said data appliance
dependent on a pre-determined condition;
if said call is to be re-routed, routing said call to said data appliance which is arranged to decode and record said fax call.

Preferably said pre-determined condition is unavailability of said fax machine.

BRIEF DESCRIPTION OF THE DRAWINGS

In order that a greater understanding of the invention can be obtained, embodiments of the invention will now be described with reference to the accompanying drawings, by way of example only and without intending to be limiting, in which.

DETAILED DESCRIPTION

Figure 1:
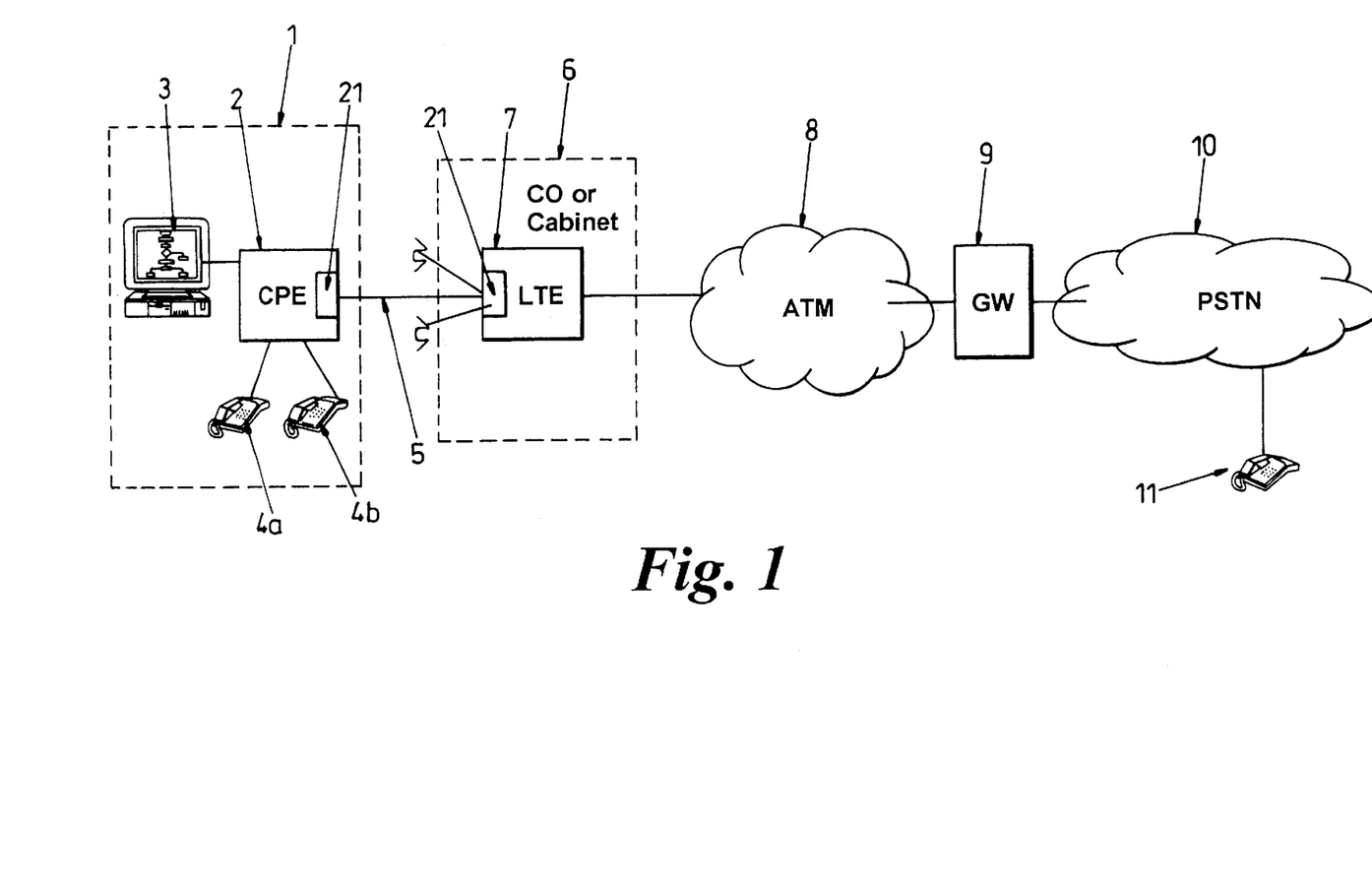
FIG. 1 shows a typical inter-connected network arrangement comprising an xDSL access network.

FIG. 1 shows a typical arrangement in which xDSL is used in a legacy access network 5 to provide multiple voice and data services to network subscribers 1. The legacy access network 5 typically comprises twisted copper pair cables, one pair running from each of a plurality of subscribers 1 to the exchange (central office) or cabinet 6. By installing suitable xDSL Line Terminating Equipment (LTE) 7 at the exchange or cabinet 6 and xDSL Customer Premises Equipment (CPE) 2 at subscriber premises 1, subscribers 1 are able to obtain multiple voice 4 and/or data 3 services over the single twisted copper pair cable or line 5 originally dedicated to them by the network operator.

The subscriber's voice 4 and data 3 channels are typically ATM virtual circuits or packet switched cells which are transferred across the access network 5 using xDSL modems 21 at the CPE 2 and the LTE 7. ATM virtual circuits are formed between the ATM interface or (shown in FIG. 2) gateway 24 or 23 to the subscriber's phone 4 or PC 3 respectively and another gateway 9 to for example the Public Switched Telephone Network (PSTN) 10. ATM cells of the virtual circuits are sent across the access network 5 using an xDSL modem 21 which converts the ATM cells into xDSL signals which in turn are interpreted by a corresponding xDSL modem 21 at the exchange LTE 7. The recovered ATM cells are sent on to the virtual circuit termination point at the PSTN gateway 9 for example. Similarly, ATM cells in a virtual circuit terminating in one of the ATM interface to one of the subscriber's communications appliances 3 or 4 are converted into xDSL signals for transmission over the access network 5 from the LTE 7 to the subscriber's CPE 2. In this way, a call may be established between for example one of the subscriber's voice phones 4a and another voice phone 11 on the PSTN 10.

Figure 2:
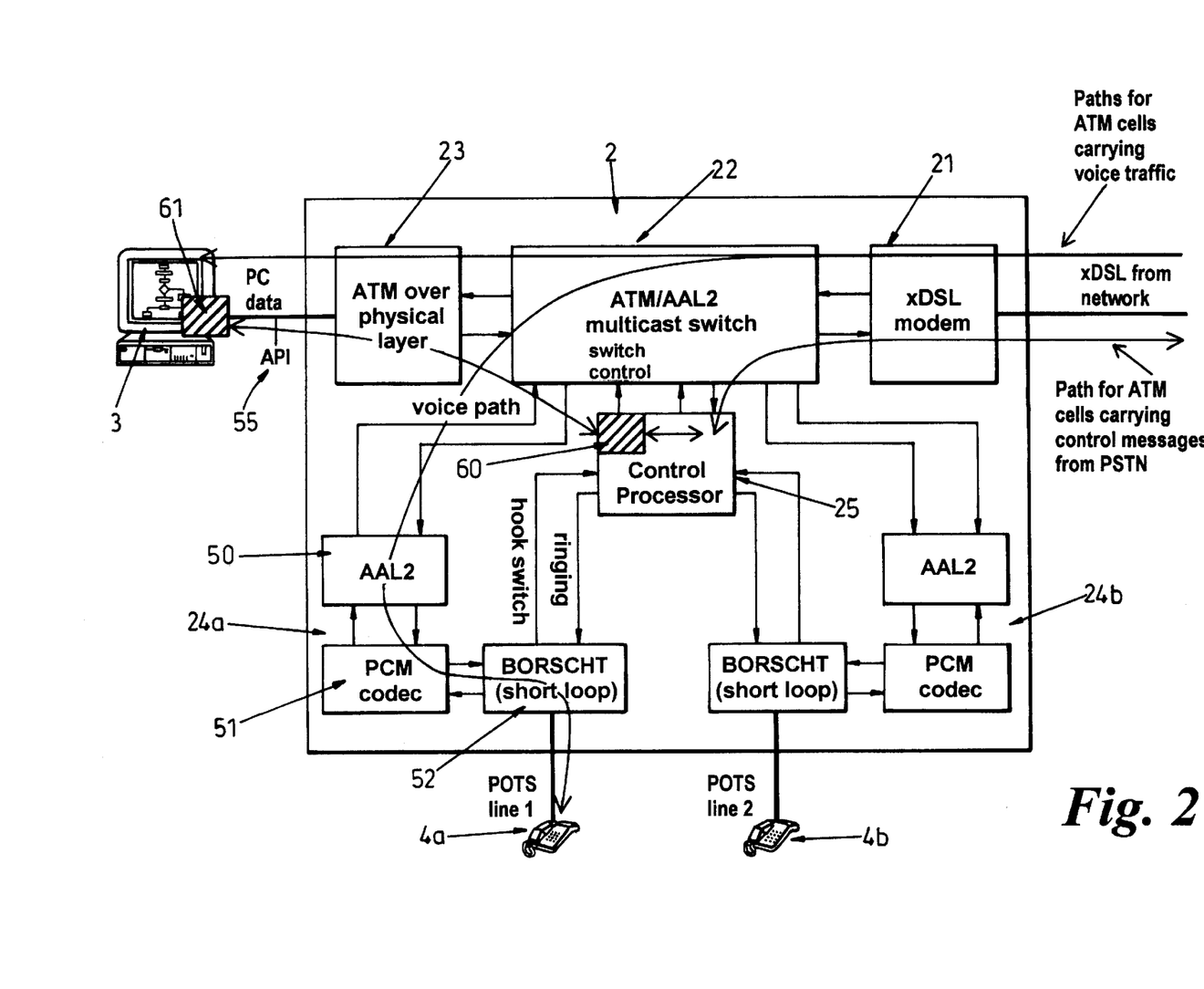
FIG. 2 is a schematic diagram of an internal architecture for VoDSL Customer Premises Equipment (CPE)

FIG. 2 shows an example Voice-over DSL (VoDSL) CPE 2 internal architecture and external connections arrangement. The CPE 2 comprises an xDSL modem 21, an ATM switch 22 which forms part of the internal packet switched network, a controller or control processor 25, two network-telephony or ATM-POTS interfaces 24a and 24b; and a data interface 23 such as an ethernet interface for example. It will be appreciated that FIG. 2 illustrates functional blocks and processes, rather than individual physical components. The control processor function 25 may be implemented on the same physical silicon as other functions in the CPE for example.

The ethernet interface 23 provides for a connection to a subscriber PC 3 and/or other subscriber data appliances such as further PCs or a set-top box. Other data protocols could alternatively be used, for example ATM-25, IEEE 1394 or Universal Serial Bus. As a further alternative, the PC 3 may be directly connected to the ATM network if suitably terminated.

The ATM-POTS interfaces 24a and 24b convert analogue voice and DTMF (Dual Tone Multi-Frequency) dialing signals from the subscriber's voice phones 4a and 4b into ATM cells for a virtual circuit and vice versa. In a preferred arrangement, the ATM-POTS interfaces 24 each comprise an AAL2 transceiver 50, a PCM codec 51, and a Borscht circuit 52. The BORSCHT circuit (Battery, Over-voltage protection, Ringing, Supervision, Coding, Hybrid, Test) is a known function which provides a physical interface to a standard analog telephone handset. In addition to a bidirectional channel carrying voice traffic, the BORSCHT function provides a logical signal 'hook switch' indicating whether the telephone receiver is lifted, and accepts a logical signal 'ringing' to ring the bell (or equivalent alerting device). The BORSCHT circuit also incorporates a PCM codec 51 which generates a sampled digital representation of the user's speech and accepts a sampled digital signal to drive the telephone earpiece.

Because of its relative simplicity and low cost implementation, ATM is the preferred layer 2 or link layer protocol. However other protocols capable of transporting the required information across the network connection, for example Internet Protocol (IP), may also be used. Corresponding POTS interface equipment 24 or gateways and data interface equipment 23 being implemented as required.

Typically, phone calls originating from one of the voice phones 4 will generate DTMF tones indicating the called number. The control processor 25 allocates a virtual circuit between the ATM-POTS interface 24 and the Gateway 9 to the PSTN, the DTMF tones being loaded into ATM cells for transport across the access network 5 via the xDSL modems 21 in the same way as speech samples later in the call. These DTMF tones are interpreted by the telephony switch forming the local interface to the PSTN 10 which routes the call to the requested destination. The request for a virtual circuit through the exchange or cabinet 6 to the gateway 9 is typically identified by recognising a hook switch event at the subscriber's phone 4—that is when the subscriber picks the phone hand piece to dial an external number, an ATM virtual circuit is allocated between the ATM-POTS interface 24 and the gateway 9.

It is a preferred implementation of VoDSL using ATM to encapsulate the information in the ML2 (ATM Adaptation Layer 2—as defined in ITU-T Recommendation I.363.2) ATM encapsulation scheme, which allows for an additional level of addressing.

The control processor 25 is arranged to enable and disable virtual circuits by controlling the ATM switch 22. The control processor is also arranged to identify hook switch events on any of the subscriber's phones 4, and additionally receives ringing messages from the exchange and signals the BORSCHT function to provide a ringing signal when appropriate to each of the voice phones 4. The xDSL modem 21 transmits and receives the ATM cells over the access network 5 using an xDSL physical-layer modulation scheme. Any suitable xDSL technology may be employed, for example HDSL, ADSL, or VDSL.

Functionally, the subscriber's CPE 2 provides high speed data access to a PC for example as well as a number of POTS lines 4a and 4b for example, each with a different number. All data and voice channels are provided over the same twisted pair copper cable 5. While the specific CPE 2 architecture described shows a single high speed data access point and 2 POTS access points 24a and 24b, numerous other combinations are possible including multiple data access points and numerous POTS access points.

VoDSL functionality is advantageous in encouraging subscribers to adopt xDSL technology, as it is a significant improvement over what is available over the previous single POTS channel historically provided or the more recent multiple narrow band ISDN technology. Additionally, where copper access pairs are scarce, and with the increasing demand for more access lines to customer premises, VoDSL allows operators to meet increased demand for high speed data and multiple telephone lines without installing additional copper.

This invention provides a novel method of operating the control processor 25 to provide enhanced services. The method uses computer functionality to communicate with the control processing function 25 of the CPE 2, which controls presentation of the telephone calls at the customer premises, leading to an enhanced and rich set of possible applications and services to enhance the customer premises network. This computer functionality can be contained within the CPE 2, the telephones 4a and 4b, or within the wider area network outside of the customer premises.

In a preferred example, the PC 3 connected to the data interface 23 of the CPE 2 provides the computer functionality. Applications running on the PC 3, communicating with the CPE control processor 25 via an API 55, extend the basic functionality of the CPE 2, which operates in a standard basic mode in the absence of the optional PC software 61.

The enhanced CPE functionality provided supports additional services over and above those supported by the access network operator via the exchange or cabinet 6 and the PSTN 10, and because these services originate from "within" the subscriber's CPE 2 or subscriber premises 1, the subscriber can configure these services and optimise them for his own needs. This additional and customizable functionality significantly improves the "added-value" of voice telephony services provided over the xDSL access network to a subscriber and will therefore contribute strongly to take-up rates by subscriber's of this technology.

The invention also provides an inventive CPE 2 architecture comprising an Application Programmers Interface (API) 55 enabling function 60. The API enabling function is associated with the control processor 25 and comprises software adapted for the CPE 2 environment which is adapted to communicate via a predetermined set of messages with a corresponding API enabling function 61 normally resident in the users PC 3. Together the API enabling functions 60 and 61 form an API 55 between the PC 3 and the control processor 25 of the CPE 2 which allows application programmes operating on the PC 3 to interact with the control processor, and provide the subscriber with enhanced services not available on standard VoDSL CPE 2.

The API 55 is preferably enabled using the connection to the data interface 23 and from there an ATM virtual circuit to the control processor 25. Control signals may then be transferred across this path between the PC and the control processor using the protocol adopted by the API enabling functions 60 and 61. The API 55 so formed allows the control processor 25 to communicate call-state and other information to the PC 3, and allows the PC 3 to influence operation of the control processor 25 which in turn configures the ATM/AAL2 switch 22 to create new ATM virtual circuits between the data interface 23, the ATM-POTS interfaces 24 and the control processor 25 depending on the service required.

As an alternative, the API 55 may be implemented over a direct connection between the PC and CPE.

The API 55 (Application Programmers Interface) allows computer functionality, such as an attached PC 3, to exchange information with the control processor 25 in the CPE. This allows optional software in the PC 61 to control "primitive" operations in the CPE 2 to implement a more complex suite of services. In the absence of this software 61 and PC 3 using the API 55, the control processor 25 on the CPE2 implements a standard basic set of functions in presenting the telephone calls.

Some of the services described herein require the use of a multicasting ATM/AAL2 switch 22, and any CPE 2 will require this ATM multicasting ability to provide those services. However the use of an ATM/AAL2 multicasting switch 22 is not essential for all services described herein, so that a standard non-multicasting ATM/AAL2 switch 22 will be adequate for these services.

The use of an ATM/AAL2 multicast switch 22 enables voice traffic and control information to be passed simultaneously to two destinations, for example to the PC 3 as well as to a subscriber phone 4.

The invention allows a large number of conceivable rich services and applications that can be enabled by combining software functionality on the PC with access to the control functionality of the CPE which controls presentation of the voice calls at the customer premises. It is the ability to share call state and traffic information between the CPE and the PC that enables these services, and this is achieved using a suitable API 55 and for some services a multicast switch 22.

It will be appreciated that in the example where the computer functionality is an attached PC 3, the PC functionality already exists for other purposes, and is normally attached to the CPE for connection across the xDSL modem to external servers (for example using the Internet). In this situation, this existing PC 3 can be used with additional software to enable the rich set of possible services through suitable communication across the API 55.

There are several ways in which the division of responsibility in re-routing calls can be placed between the PC 3 and the control processor 25 on the CPE 2. At one extreme, for example, the PC 3 can be configured just to inform the processor 25 once that, until told otherwise, it should route calls intended for e.g. line 1 to line 2. However, this has the disadvantage that if the PC should fail, the CPE is no longer providing its basic function. A preferred approach is to implement communication with the PC 3 (across the API 55) on a call-by-call basis, ensuring basic operation of the CPE 2 except where explicitly enhanced under instruction from the PC application 61.

The following is a non-exhaustive list of services which can be implemented using the inventive methods described herein:

Time-dependent or predetermined re-routing of incoming call

Routing of incoming call based on the CLI information.

Call monitoring and logging on the PC of all outgoing calls

Personal voice-mail facility provided on the PC

FAX routing to the PC

Make POTS calls from PC hands free voice using PC sound card and processing power point and click dialing from PC address book Answer POTS calls on PC Call transfer between PC and telephone handset by monitoring hook state in control processor PC log of CLI of all incoming calls, pop up caller name, etc. uses PC screen to display caller related information Second (or third) line when first is in use single or multiple numbers for incoming calls additional revenue opportunity for operator, especially for emulated fax and voice-band modem facilities Incoming call hunt group (all lines ring)

PC acts as fax machine on (either) POTS line

PC simulates voice-band modem on POTS line for access to dialup (non-xDSL) data services improved usage of xDSL link if modem emulation done in network PC provides voice mail on (either) POTS line PC implements CLASS services Optional fallback to lower audio bit rate during periods of high data activity compression using PC processing power (requires network support for decompression back to 64 kbit/s); alternatively, compression could use 'spare' capacity in xDSL modem DSP Intercom/PBX facility between POTS lines and/or PC Incoming call agent, PC greets caller and invites caller to choose who to speak to, may take account of CLI when offering options Call redirection (by tromboning), third party, etc.

In order to explain how these services cant be implemented, there follows examples of some sample services and for example how these are implemented using the invention.

1/Time-dependent or Pre-determined Re-routing of Incoming Call

This service allows the customer to control routing of calls to telephone lines attached to the CPE 2, based on some pre-determined condition that is known to the software 61 on the PC 3. This might include routing according to the time of day (e.g. diverting calls from a child's line to an adult's line after a certain time) or diverting a call from one line to another based on known absence of the recipient or location of the recipient elsewhere on the premises.

Figure 3:
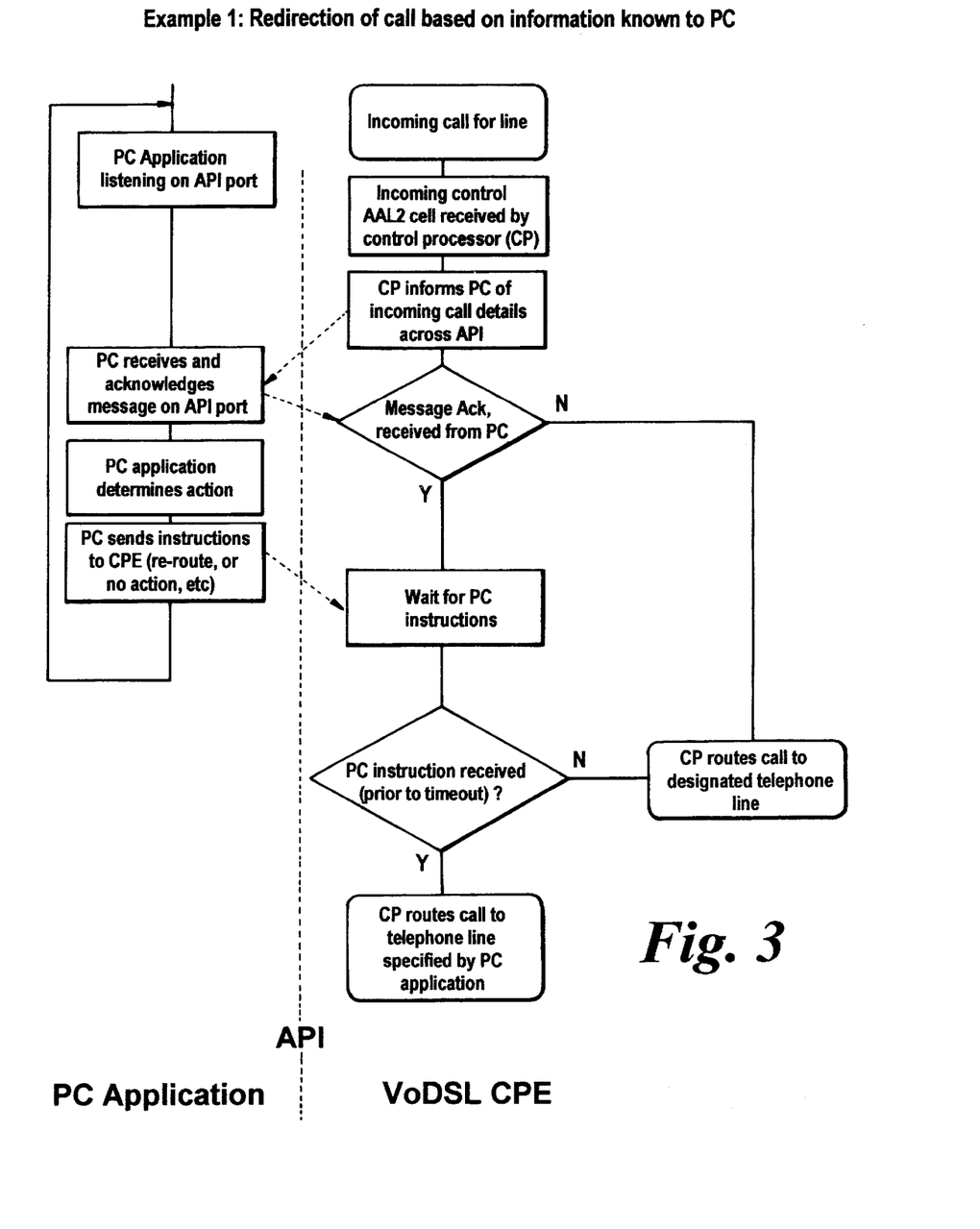
FIG. 3 is a flow diagram for a time-dependent/pre-determined re-routing of an incoming call service.

The following is a description of the steps in a possible implementation of this service, referenced to the flow diagram of FIG. 3.

An incoming voice call is signaled to the CPE 2 by an AAL2 cell which has an indicator field set to indicate that it is a control message. This is switched by the ATM/AAL2 switch 22 to the control processor 25. The control processor 25 informs the PC 3 of the incoming call details by means of a message across the API 55. The PC application 61 listening on the appropriate port for the API 55 responds with an acknowledgement. In the absence of such an acknowledgement, the control processor 25 is configured to recognise that there is not an interested PC application 61 live on the PC (or that the PC is not on), and routes the incoming call to the designated telephone line immediately.

Once the CPE control processor 25 has received an acknowledgement from the PC application 61, it waits for a predetermined time-out period for further instructions from the PC 3 (say up to one or two seconds). During this time, the PC application 61 determines the action required given the information on the incoming call, such as a re-routing because of the current time. The PC application 61 then sends a recognised instruction across the API 55 to the control processor 25 on the CPE. The control processor 25 then completes the connection of the incoming call, routing it as appropriate.

If no message is received from the PC 3, following the initial acknowledgement, within the allowable time period, the control processor 25 proceeds by establishing the call to the designated telephone line on the CPE (e.g. 4a or 4b).

In a preferred implementation, use of a multicasting ATM/AAL2 switch 22 is made such that the switch 22 routes the incoming call information to both the PC 3 and the intended telephone 4 so that if the PC 3 does not respond, the CLI information for example from the call reaches the intended phone 4.

2/CLI-information-dependent Routing of Incoming Call

This service allows the subscriber or user to perform functions similar to those outlined in example 1, but here basing the action on the CLI (Calling Line Identifier) of the incoming telephone call.

The process is similar to that in example 1, but here the situation is complicated slightly by the necessity for the PC 3 to initially have access to the voice-path traffic data for the incoming call such that it can decode and process the incoming CLI information.

Figure 4:
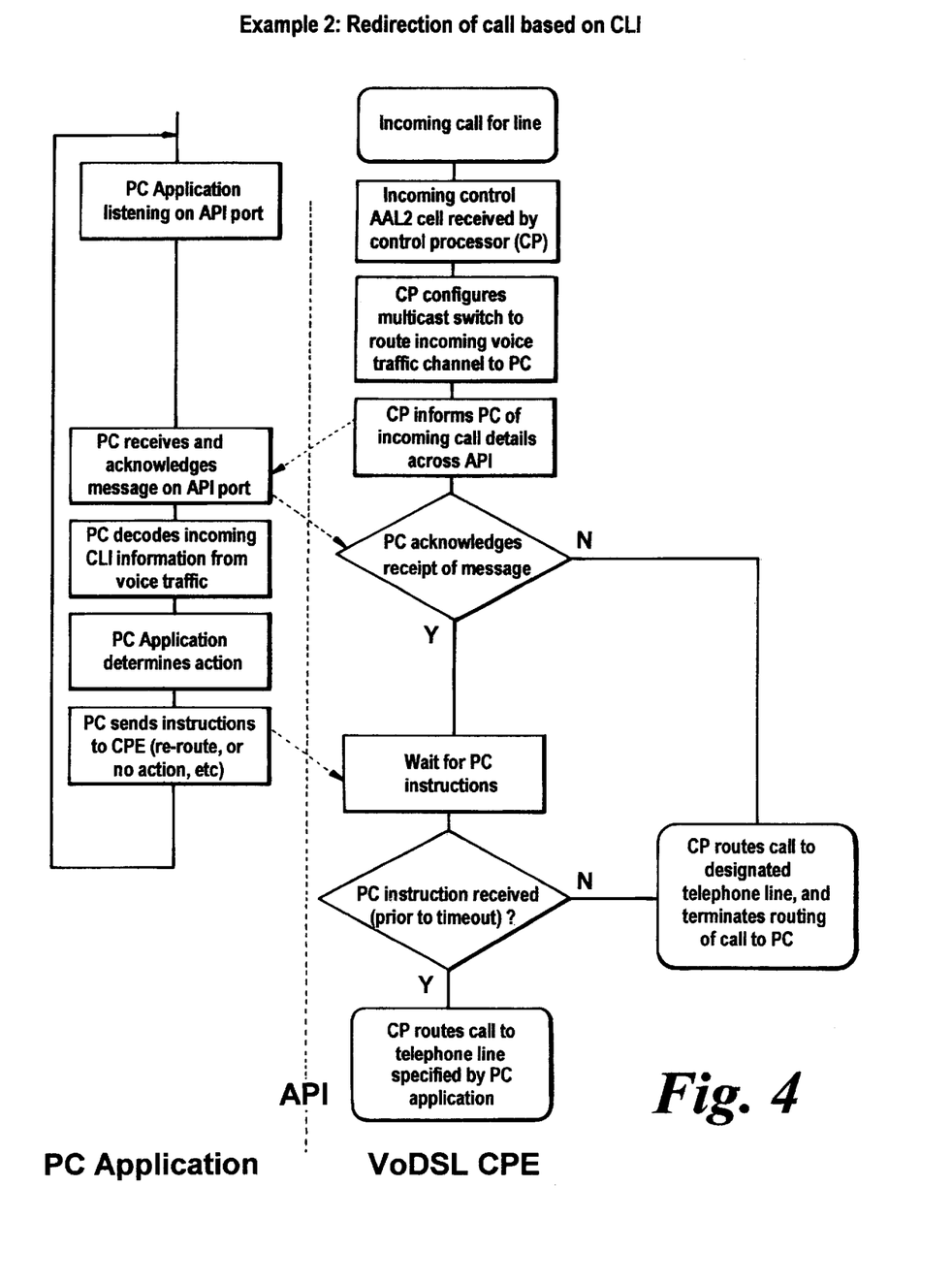
FIG. 4 is a flow diagram for rerouting of incoming calls based on the identity of the caller as specified by the Calling Line Identification (CLI) information supplied by the PSTN.

A typical algorithm or procedure is outlined in the flow diagram shown in FIG. 4. An incoming call is signaled by the external network by an appropriate AAL2 control message which is switched by a multicast ATM/AAL2 switch 22 to the control processor 25 The control processor 25 immediately configures the multicast switch 22 to route incoming voices or traffic cells to the PC 3 The control processor also sends a message across the API 55 informing the PC application 61 listening on the appropriate port that there is an incoming call. As in example 1, the PC acknowledges receipt of the message, which informs the control processor 25 on the CPE that the PC 3 has an interested application running. In the absence of such an acknowledgement, the control processor 25 routes the call to the designated line number (e.g. 4a or 4b), ceasing the routing of the call to the PC 3.

Once the PC 3 is informed that there is an incoming call, it receives the voice-traffic data, which is decoded and processed until the CLI data has been received and interpreted. The PC application 61 then decides on the routing of the call based on the calling-party being identified, and signals the desired action to the CPE control processor 25 across the API 55. As soon as the control processor 25 receives the instruction from the PC application 61, it ceases routing of the traffic path data for the incoming call to the PC 3, and routes it to the appropriate telephone port (e.g. 4a or 4b) on the CPE 2 as specified by the PC application 61.

In the absence of the PC application 61 having instructed the CPE within a predetermined timescale, the control processor 25 proceeds by routing the call to the designated telephone, and ceases routing of the call to the PC.

Preferably the ATM cells which carry the voice-band traffic are routed all the way to the PC, which perform the AAL2 cell to PCM operations. This will require carriage of the ATM cells across the physical layer between the CPE 2 and the PC 3 (e.g. Ethernet) using a suitable protocol, such as BMAP (Broadband Modem Access Protocol) adopted by the ADSL Forum (see for example ADSL Forum contribution 98-018R2, September 1998).

As a further enhancement, to this service, the PC with a suitable on-board modem is configured to give a short voice path connection to the designated telephone by the control processor 25 configuring the multicast switch 22, in order to send the CLI information to the telephone. This is preferably done immediately before breaking this connection and routing the incoming traffic path information to the telephone circuitry. Since the modem required to generate CLI signals is relatively simple, preferably the modem function is performed using software running on the PC.

3/Call-monitoring and Logging Applications

As mentioned above, there is a whole suite of possible applications related to the PC 3 having access to call state (when phones go off-hook and on-hook), calling destination and call duration for both incoming and outgoing calls.

In these cases, the control processor 25 sends messages across the API 55 to an application 61 on the PC 3 listening on the appropriate port. Where information about the called number is required, a copy of the outgoing voice traffic path is routed through the multicast ATM AAL2 switch 22 to the PC such that it can decode the DTMF tones being sent to the PSTN network. Preferably, DTMF decoding is implemented in the PC 3 using software running on the PC.

Figure 5:
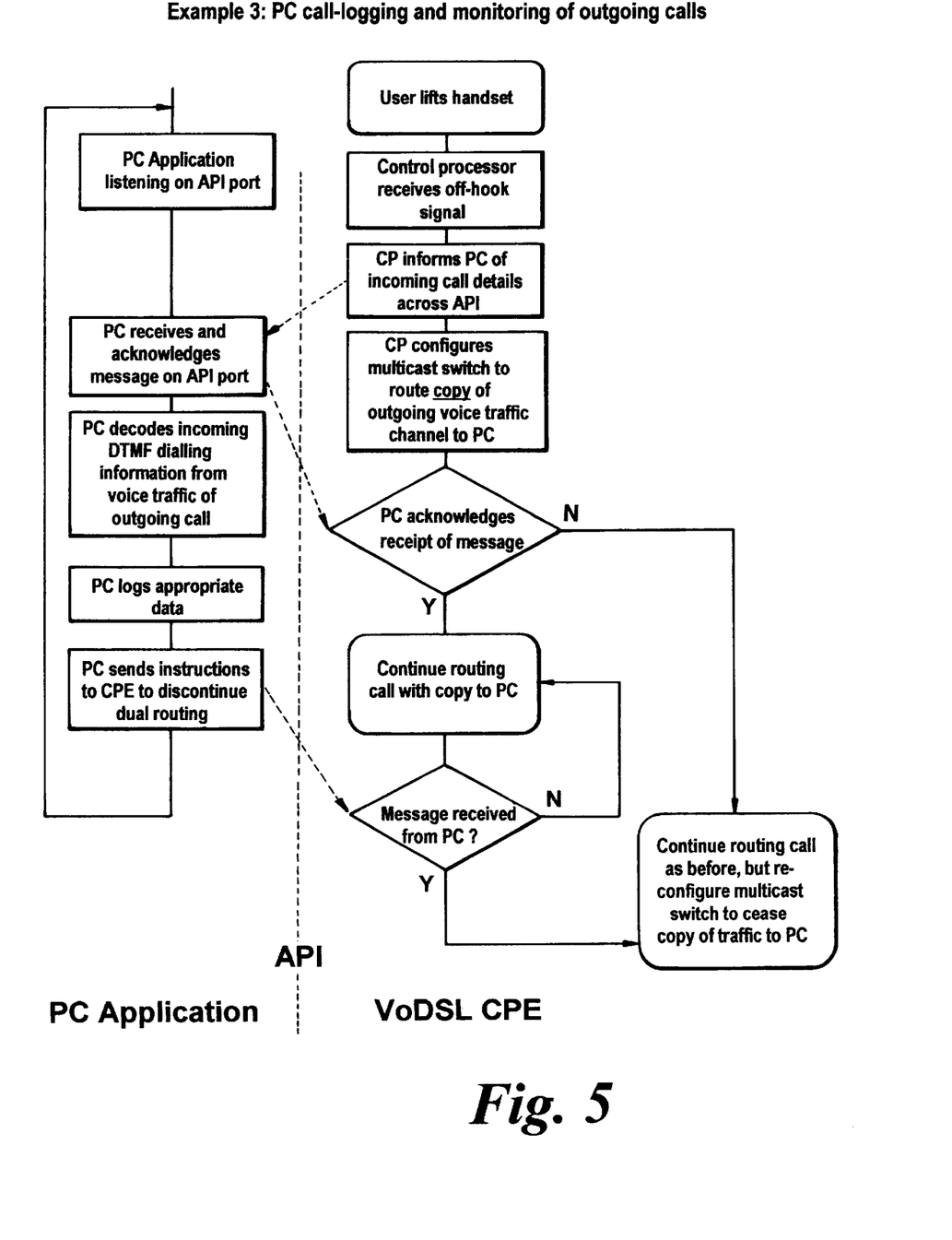
FIG. 5 is a flow diagram for a call monitoring and logging service.

The flow diagram for the specific example 3 shown in FIG. 5 is just one possible service, in which the PC application makes a log of the number being called. This example is kept simple to illustrate the principle, and it will be appreciated that additional messages could be sent by the control processor 25 to allow the PC application to determine for example the duration of the call, etc.

Referring to the flow diagram, when a user at the customer premises lifts a handset of a telephone (e.g. 4a) connected to the CPE 2, the control processor 25 receives a signal informing it that the telephone 4a is off-hook. The call processor 25 then sends a message to this effect across the API 55 to the PC application 61. The control processor 25 also configures the multicast switch 22 to route (via a virtual circuit) a copy of the outgoing voice traffic information to the PC 3, which is also routed to the PSTN 10 across the xDSL link The PC 3 receives and acknowledges the message across the API 55. In the absence of an acknowledgement, the CPE control processor 25 continues routing the call externally, and reconfigures the multicast switch to cease copying the traffic to the PC 3.

The PC 3 receives and decodes the incoming voice-path data including the DTMF tones that contain the dialed number. The PC 3 then stores the information as appropriate. Once the PC application 61 has the desired information on the dialed number, the PC application 61 sends a message to the CPE control processor 25 across the API 55 to say it no longer needs the copy of the voice path. The control processor 25 then reconfigures the ATM/AAL2 multicast switch to cease copying the traffic path to the PC.

The control processor sends additional messages to the PC to inform it when the call has been picked up or terminated, allowing the PC application to log the length of the call.

The above is one possible example, and the skilled artisan will readily appreciate that other variations are possible.

4/Personal Voice-mail Facility

This application provides an extended voice service that can be implemented by the PC attached to the data interface. It is applicable as an extended possible scenario for both examples 1 and 2 above.

The PC is used to provide a local and private (to the customer premises) voice-mail facility. For both examples 1 and 2 above, the PC application informs the control processor 25 (through the API) to route the incoming call to the PC, which presents the outgoing voice mail greeting and stores the incoming call message. The control processor 25 configures the ATM switch 22 to route the voice-path traffic to/from the PC.

5/FAX Routing to the PC

An extension to example 4 is an application where the PC is configured to recognise that the incoming call is a FAX going to the FAX machine. It is then configured to request that either the FAX is routed to the PC or copied to the PC (this requires a multicasting ATM/AAL2 switch 22), where it is decoded and saved by the PC application 61, and details logged. This service is implemented under PC 3 control as an optional operation on a call-by-call basis, with the FAX routed only to the designated FAX machine in the absence of PC 3 instructions to do otherwise.

Calls by fax can be identified by the presence of known tones at the start of the call.

Preferably only a basic set of elementary functions or services are implemented with the CPE alone. This allows the cost and power consumption of the CPE to be minimised. The external PC is optionally connected to the CPE via a communications port (data interface) and interacts with it by specifying combinations of the elementary functions to implement a more complex service set. The PC is a low cost commodity item having comprehensive storage facilities and a large amount of processing power and is likely to be present in many premises where enhanced telephony services may be required. Service enhancements can be implemented by including extra software elements in the suite of applications running on the PC. Methods for performing such software upgrades are well known and include, for example, downloading software elements from web sites using an Internet connection.

It is recognised that the reliability of PCs and their associated software does not always approach the reliability expected of a national telephone network. The CPE therefore presents its basic operational state whenever the PC 3 or other computer functionality accessed via the API 55 is unavailable, either because the PC is switched off, has failed, or appropriate software is not running on the PC. The end user is therefore assured of at least a basic set of functionality at all times.

As a further alternative, the CPE may be designed to comprise additional functionality so that it can provide some or all of the above mentioned service enhancements without the need for communication with a PC 3.

As a still further alternative, the PC applications 61 may be run on a remote PC and the API 55 implemented over an ATM virtual circuit that extends over the DSL link across the access network for example. Various other distributed computing function arrangements could also be used as would be obvious to a person skilled in the art.

By way of example only, a possible subset of commands and information messages is described below which may be sent across the API to allow interaction between the PC and the basic elementary functions implemented in the CPE. This list is included for illustration and other possible command and information sets will be evident to those skilled in the art. Standard software and message communication techniques can be used for practical implementation of such a command and information set across a standard communications interface, such as ethernet.

Information messages from the CPE to the PC:

Incoming call on line n (where n represents one of the equipped telephone lines on the CPE)

Handset of line n lifted.

Handset of line n replaced.

Commands from the PC to the CPE:

Route (or cease routing) incoming (or outgoing) voice path traffic for line n to PC Copy (or cease copying) incoming (or outgoing) voice path traffic for line n to PC Re-route traffic intended for line n to line m (where m is another equipped telephone line on the CPE)

Alert (ring the bell) on line n.

In the preferred embodiment a part of the CPE control functionality is abstracted (separated) into the PC, which does (optionally when switched on) a subset of the functions controlling POTS call presentation. The PC provides a "hook" for applets that control the CPE as required through the API. The presentation of POTS service is still completely dependent on the CPE functionality, and the PC is only used to provide local enhanced features, such as routing of one phone to another dependent on the time of day or availability of an individual.

In one embodiment of the invention, the distribution of the abstracted functionality of the CPE goes beyond the PC, to the wider external data network, either through the PC or direct from the CPE. CORBA (Common Object Request Broker Architecture) may be implemented as a suitable tool for this. This external access could be through the DSL link provided by the VoDSL CPE.

An example of an application where distributed optional control may be implemented is where a corporation provides an employee with a set of work-at home applications to give extended presentation of services available within the private enterprise network, and where this functionality is accessed across the external wider area network.

As described above, in the preferred embodiment the PC functionality that provides these services is implemented within the users PC 3. This is advantageous as it allows the internal architecture including the processing and storage capabilities of the CPE to remain at a relatively low level such that a standard VoDSL CPE with additional programming can be utilised to implement the invention. This is advantageous in keeping the CPE equipment cheap, in that there is no need to design additional capability into the CPE to implement the services. The preferred arrangement also allows the user to implement new services by simply upgrading the applications on the PC 3. These advantages provide a cost effective and readily upgradeable set of enhanced services that can be easily configured to meet the user's personal needs. It also allows for the development of additional services not described above which could be easily implemented with new software applications loaded onto the users PC 3.

While the preferred embodiment uses the available computing power of the users PC 3 as the arrangements computing function, these services could alternatively be implemented using the CPE 2 above, the CPE 2 being enhanced with additional processing and storage capacity plus programming, as well as a DTMF modem when required for user interactive services.

In a yet further alternative, the processing and storage capacity plus programming required is distributed between the PC 3 and CPE 2 leaving the CPE 2 with a basic set of services for example, in the event the PC 3 becomes disconnected from the CPE 2 or is switched off. Further this PC functionality may be further distributed for example to the exchange 6 or to an "on-line" remote computer accessed through, for example, the xDSL link.

While the invention has been described with reference to a VoDSL system, other digital access systems (DAS) can alternatively be used—for example optical, E1, and data modem over coax as in cable TV.

The foregoing describes the invention including preferred embodiments thereof. Alternations and modifications as would be obvious to those skilled in the art are intended to be incorporated within the scope hereof.

What is claimed is:

1. Digital Access Systems (DAS) Customer Premises Equipment (CPE) comprising:

an internal packet switched network comprising a switch;

a DAS modem connected to said internal network and arranged such that in use the internal network is coupled to an external packet switched network by a DAS link over an access network;

a network-telephony interface connected to said internal network and coupled to a customer premises telephony appliance;

a network-data interface connected to said internal network and coupled to a customer premises data appliance;

a controller arranged to control said switch in order to establish packet transfer paths between said modem and said interfaces to complete calls between said appliances and entities on the external network;

and means for transferring control and information signals between said controller and a computing function in order to adapt the controller to provide alternative packet transfer paths dependent on predetermined conditions in order to provide one or more additional CPE services.

2. A CPE as claimed in claim 1, wherein said DAS is Voice over Digital Subscriber Line (DSL).

3. A CPE as claimed in claim 2, wherein said means comprises an application programmers interface enabling function corresponding to an application programmers interface enabling function in said computer function which together form an application programmers interface (API) between said means and said computer function over which said signals are transferred.

4. A CPE as claimed in claim 3, wherein said CPE comprises said computing function.

5. A CPE as claimed in claim 3, wherein said computing function is external to said CPE.

6. A CPE as claimed in claim 5, wherein said computing function is associated with a Personal Computer connected to said network-data interface.

7. A CPE as claimed in claim 6, wherein said API is formed across said interface.

8. A CPE as claimed in claim 2, wherein said switch is a multicasting switch.

9. A CPE as claimed in claim 2, wherein said internal network is an ATM network.

10. A CPE as claimed in claim 2, wherein said telephony appliance comprises a telephone or a fax.

11. A CPE as claimed in claim 2, wherein said data appliance comprises a Personal Computer.

12. A CPE as claimed in claim 2, wherein said controller is a control processor.

13. A CPE as claimed in claim 7, wherein said switch is a multicasting switch.

14. A CPE as claimed in claim 7, wherein said internal network is an ATM network.

15. A CPE as claimed in claim 7, wherein said telephony appliance comprises a telephone or a fax.

16. A CPE as claimed in claim 7, wherein said data appliance comprises a Personal Computer.

17. A system comprising a DAS CPE, a customer premises data appliance connected to said CPE, a customer premises telephony appliance connected to said CPE, wherein said CPE is connected in use to an access network, and wherein said CPE comprises:
   an internal packet switched network comprising a switch;
   a DAS modem connected to said internal network and arranged such that in use the internal network is coupled to an external packet switched network by a DAS link over said access network;
   a network-telephony interface connected to said internal network and coupled to said customer premises telephony appliance;
   a network-data interface connected to said internal network and coupled to said customer premises data appliance;
   a controller arranged to control said switch in order to establish packet transfer paths between said modem and said interfaces to complete calls between said appliances and entities on the external network;
   and means for transferring control and information signals between said controller and a computing function in order to adapt the controller to provide alternative packet transfer paths dependent on predetermined conditions in order to provide one or more additional CPE services.

18. A system as claimed in claim 17, wherein said DAS is VoDSL.

19. A method of operating a Digital Access System (DAS) Customer Premises Equipment (CPE) to provide a re-routing of incoming calls service, said CPE comprising:
   an internal packet switched network comprising a switch;
   a DAS modem connected to said internal network and arranged such that in use the internal network is coupled to an external packet switched network by a DAS link over an access network;
   two or more network-telephony interfaces connected to said internal network and coupled to a first and second customer premises telephony appliance respectively;
   a network-data interface connected to said internal network and coupled to a customer premises data appliance;
   a controller arranged to control said switch in order to establish packet transfer paths between said modem and said interfaces to complete calls between said appliances and entities on the external network;
   and means for transferring control and information signals between said controller and a computing function in order to adapt the controller to provide alternative packet transfer paths dependent on predetermined conditions in order to provide one or more additional CPE services;
   said method comprising:
      receiving an incoming call for said first telephony appliance;
      determining whether said incoming call is to be re-routed to said second telephony appliance dependent on one or more pre-determined conditions;
      if said call is to be re-routed, adapting said controller to establish a packet transfer path for said call to said second network-telephony interface in order to re-route said call to said second telephony appliance.

20. A method as claimed in claim 19 wherein said pre-determined condition is a pre-determined time of day.

21. A method as claimed in claim 19 wherein said pre-determined condition is a pre-determined absence of the user of said first telephony appliance.

22. A method of operating a Digital Access System (DAS) Customer Premises Equipment (CPE) to provide a re-routing of incoming calls service, said CPE comprising:
   an internal packet switched network comprising a switch;
   a DAS modem connected to said internal network and arranged such that in use the internal network is coupled to an external packet switched network by a DAS link over an access network;
   two or more network-telephony interfaces connected to said internal network and coupled to a first and second customer premises telephony appliance respectively;
   a network-data interface connected to said internal network and coupled to a customer premises data appliance;
   a controller arranged to control said switch in order to establish packet transfer paths between said modem and said interfaces to complete calls between said appliances and entities on the external network;
   and means for transferring control and information signals between said controller and a computing function in order to adapt the controller to provide alternative packet transfer paths dependent on predetermined conditions in order to provide one or more additional CPE services;
   said method comprising:
      receiving an incoming call for said first telephony appliance;
      receiving incoming caller identity information from said call;
      determining whether said incoming call is to be re-routed to said second telephony appliance dependent on the identity of said caller;
      if said call is to be re-routed, adapting said controller to establish a packet transfer path for said call to said second network-telephony interface in order to re-route said call to said second telephony appliance.

23. A method as claimed in claim 22 wherein said incoming caller identity information is a Calling Line Identifier (CLI).

24. A method of operating a Digital Access System (DAS) Customer Premises Equipment (CPE) to provide a call monitoring and logging service, said CPE comprising:
   an internal packet switched network comprising a switch;
   a DAS modem connected to said internal network and arranged such that in use the internal network is coupled to an external packet switched network by a DAS link over an access network;
   a network-telephony interface connected to said internal network and coupled to a first customer premises telephony appliance;

a network-data interface connected to said internal network and coupled to a customer premises data appliance;

a controller arranged to control said switch in order to establish packet transfer paths between said modem and said interfaces to complete calls between said appliances and entities on the external network;

and means for transferring control and information signals between said controller and a computing function in order to adapt the controller to provide alternative packet transfer paths dependent on predetermined conditions in order to provide one or more additional CPE services;

said method comprising:

receiving an outgoing call from said telephony appliance;

receiving called party identity information from said appliance;

storing said called party information;

determining when the called party answers the outgoing call;

determining when the call is terminated;

determining the length of said call;

storing said call length with said called party information.

25. A method of operating a VoDSL CPE to provide a voice mail service, said CPE comprising:

an internal packet switched network comprising a switch;

a DAS modem connected to said internal network and arranged such that in use the internal network is coupled to an external packet switched network by a DAS link over an access network;

a network-telephony interface connected to said internal network and coupled to a first customer premises telephony appliance;

a network-data interface connected to said internal network and coupled to a customer premises data appliance;

a controller arranged to control said switch in order to establish packet transfer paths between said modem and said interfaces to complete calls between said appliances and entities on the external network;

and means for transferring control and information signals between said controller and a computing function in order to adapt the controller to provide alternative packet transfer paths dependent on predetermined conditions in order to provide one or more additional CPE services;

said method comprising:

receiving an incoming call for said telephony appliance;

determining whether said incoming call is to be re-routed to said data appliance dependent on a pre-determined condition;

if said call is to be re-routed, routing said call to said data appliance which is arranged to record said call.

26. A method as claimed in claim 25 wherein said pre-determined condition is a pre-determined absence of the user of said telephony appliance or failure of said user to answer said call.

27. A method of operating a Digital Access System (DAS) Customer Premises Equipment (CPE) to provide a fax call to PC routing service, said CPE comprising:

an internal packet switched network comprising a switch;

a DAS modem connected to said internal network and arranged such that in use the internal network is coupled to an external packet switched network by a DAS link over an access network;

a network-telephony interface connected to said internal network and coupled to a first customer premises telephony appliance;

a network-data interface connected to said internal network and coupled to a customer premises data appliance;

a controller arranged to control said switch in order to establish packet transfer paths between said modem and said interfaces to complete calls between said appliances and entities on the external network;

and means for transferring control and information signals between said controller and a computing function in order to adapt the controller to provide alternative packet transfer paths dependent on predetermined conditions in order to provide one or more additional CPE services;

said method comprising:

receiving an incoming call;

determining that said incoming call is intended to be received by a fax machine;

determining whether said incoming call is to be re-routed to said data appliance dependent on a pre-determined condition;

if said call is to be re-routed, routing said call to said data appliance which is arranged to decode and record said fax call.

28. A method as claimed in claim 27 wherein said pre-determined condition is unavailability of said fax machine.

29. A method according to claim 19 in which the Digital Access System is a Voice over DSL system.

* * * * *